United States Patent
Aoki et al.

(10) Patent No.: US 7,597,842 B2
(45) Date of Patent: Oct. 6, 2009

(54) HYDROGEN PERMEABLE ALLOY

(75) Inventors: Kiyoshi Aoki, Kitami (JP); Kazuhiro Ishikawa, Kitami (JP); Tsuyoshi Sasaki, Muroran (JP); Toshiki Kabutomori, Muroran (JP)

(73) Assignees: The Japan Steel Works, Ltd., Tokyo (JP); National University Corporation Kitami Institute of Technology, Hokkaido (JP)

( * ) Notice: Subject to any disclaimer, the term of this patent is extended or adjusted under 35 U.S.C. 154(b) by 360 days.

(21) Appl. No.: 11/390,186

(22) Filed: Mar. 28, 2006

(65) Prior Publication Data

US 2007/0048171 A1   Mar. 1, 2007

(30) Foreign Application Priority Data

Aug. 24, 2005   (JP) .......................... P2005-243047

(51) Int. Cl.
*C22C 27/02*   (2006.01)
(52) U.S. Cl. .................. 420/426; 420/425; 420/900
(58) Field of Classification Search .................. 420/425, 420/426, 900
See application file for complete search history.

(56) References Cited

U.S. PATENT DOCUMENTS

| 6,258,184 | B1 * | 7/2001 | Iba et al. ..................... 148/421 |
| 2004/0129135 | A1 * | 7/2004 | Roark et al. .................... 95/55 |

FOREIGN PATENT DOCUMENTS

| JP | 11-276866 A | 10/1999 |
| JP | 2000-159503 A | 6/2000 |
| JP | 2004-42017 A | 2/2004 |

\* cited by examiner

*Primary Examiner*—Roy King
*Assistant Examiner*—Caitlin Fogarty
(74) *Attorney, Agent, or Firm*—Sughrue Mion, PLLC

(57) ABSTRACT

An Nb—Ti—Co alloy having both good hydrogen permeability and good hydrogen embrittlement resistance comprises one of Fe, Cu or Mn as a fourth element, incorporating from 1 to 14 mol %. The content of Mn, if any, is preferably from 1 to 9 mol %. The desired hydrogen permeability can be attained by the (Nb, Ti) phase and the desired hydrogen embrittlement resistance can be attained by the CoTi phase, making is possible to obtain excellent hydrogen permeability and excellent hydrogen embrittlement resistance. None of Fe, Cu or Mn can impair these properties. Fe, Cu or Mn can replace some of the Co elements. Fe, Cu or Mn enhances the workability of the alloy.

4 Claims, 1 Drawing Sheet

HYDROGEN PERMEABLE ALLOY

This application is based on Japanese Patent Application No. 2005-243047, which is incorporated herein by reference.

BACKGROUND OF THE INVENTION

1. Field of the Invention

The present invention relates to a hydrogen permeable alloy as a hydrogen permeable membrane for use in the separation and purification of hydrogen.

2. Description of the Related Art

Highly pure hydrogen has been used to produce semiconductors, optical fibers and chemicals. The amount of highly pure hydrogen in use has been increasing every year. In recent years, hydrogen has also become known as a fuel for fuel cells. If fuel cells are used on a large scale in the future, highly pure hydrogen will be needed in large amounts. For this reason, it is desirable to develop a method capable of mass-producing hydrogen, including (1) a water electrolysis method involving the use of non-fossil fuel, and (2) a steam reforming method of hydrocarbon involving the use of fossil fuel. In regards to the electrolysis method (1), water electrolysis generation as an electric supply has been under study, but it is difficult to put it into practical use at the present technical level. Accordingly, at present it is most realistic to produce hydrogen by stream reforming hydrocarbons (2).

When producing hydrogen by stream reforming of hydrocarbons, the reaction system contains impure gases such as CO, $CO_2$, $H_2O$ and $CH_4$ in addition to a large amount of hydrogen. In order to utilize hydrogen as a raw material to be supplied to the fuel cell, hydrogen must be separated and purified from these impurities. Further, Pt electrodes in the fuel cell will undergo damage unless the content of CO in purified hydrogen is reduced to 10 ppm or less. In other words, in order to use hydrogen in the fuel cell, hydrogen must be purified to a high degree.

Examples of hydrogen purifying methods include the absorption method, cryogenic distillation method, and the membrane separation method. Among these, the most efficient method for producing highly pure hydrogen is the membrane separation method utilizing metals.

The mechanism of the permeation of hydrogen in the metallic membrane is described below. When a hydrogen pressure difference occurs across the metallic membrane, hydrogen molecules ($H_2$) are dissociated into hydrogen atoms (H) on the surface of the high pressure side of the metallic membrane. The hydrogen atoms are then dissolved into the metal. These hydrogen atoms permeate through the metallic membrane to the low pressure side, on which they are then combined to produce $H_2$ molecules which then come out of the metallic membrane. This results in the purification of hydrogen. The purification of hydrogen through a metallic membrane is characterized by an extremely great separation factor and permeability. The purification of hydrogen using a metallic membrane allows the purity of hydrogen to rise from about 99% to about 99.99999%. Accordingly, it can be said that the membrane separation method using a metallic membrane is suitable for the purification of hydrogen in order to produce highly pure hydrogen for fuel cells.

In regards to the hydrogen permeable membrane technique, the Pd alloy has been mainly put into practical use. However, when fuel cells are used on a large scale, a large amount of hydrogen will be needed. Accordingly, the demand for the Pd—Ag alloy as a hydrogen permeable metallic membrane will grow. If this happens, Pd, which is an expensive and scarce resource, will be the limiting factor that makes it impossible for the Pd alloy membrane to meet the industrial demand. Therefore, it is keenly desirable to develop substitute materials for the metallic membrane.

For example, JP-A-11-276866 discloses an alloy based on V, Nb or Ta. V, Nb and Ta are known to have excellent hydrogen permeability as compared with the Pd alloy. However, these elements have an extremely great hydrogen solubility and thus can easily undergo cracking due to hydrogen embrittlement when used in a simple substance. Therefore, it is necessary for these elements to be alloyed to have a reduced hydrogen solubility. In general, however, these elements exhibit deteriorated hydrogen permeability when they have a cracking resistance-enhancing element incorporated therein. JP-A-11-276866 makes no definite reference to the kind of additive elements and their use and thus cannot provide practical hydrogen permeable alloys excellent both in hydrogen permeability and cracking resistance.

In addition, JP-A-2000-159503 also discloses Nb-based hydrogen permeable alloys. In JP-A-2000-159503, it is assumed that these alloys occur in a single phase. However, it is difficult to cause a single phase to attain conflicting properties, i.e., hydrogen permeability and hydrogen embrittlement resistance. In order to attempt to inhibit the hydrogen embrittlement of these alloys, the hydrogen solubility of these alloys must be unavoidably lowered, causing the deterioration of hydrogen permeability.

As a means of inhibiting hydrogen embrittlement, JP-A-2004-42017 discloses a hydrogen permeable membrane made of an amorphous alloy. However, since the diffusion coefficient of hydrogen in an amorphous alloy is generally lower than that of crystalline materials, the proposed hydrogen permeable membrane cannot provide high hydrogen permeability. Further, since such an amorphous material undergoes crystallization when the temperature rises, the working temperature is limited. In particular, an amorphous alloy prepared for hydrogen permeation contains elements having a high bonding force to hydrogen and thus undergoes crystallization at lower temperatures in hydrogen.

In order to render a hydrogen permeable alloy excellent both in hydrogen permeability and hydrogen embrittlement resistance, the idea of a composite alloy has been proposed which causes different phases to attain hydrogen permeability and hydrogen embrittlement resistance. In this light, some of the present inventors propose an Nb—Ti—Co-based alloy. This alloy causes the (Nb, Ti) phase and the CoTi phase to attain hydrogen permeability and hydrogen embrittlement resistance, respectively, making it possible to attain hydrogen permeability and hydrogen embrittlement resistance which are equal to or better than that of Pd alloy membranes.

However, the above proposed Nb—Ti—Co alloy is disadvantageous in that it is comprised of Co, which is relatively expensive, and thus adds to material costs. For practical purposes, it is necessary that a fourth element be incorporated to improve the properties of rollability, weldability, etc.

SUMMARY OF THE INVENTION

The invention has been worked out to solve the aforementioned problems. The object of the invention is to provide a hydrogen permeable alloy which exhibits both good hydrogen permeability and good hydrogen embrittlement resistance when Co elements to be incorporated therein are partly replaced by other inexpensive elements.

According to a first aspect of the invention, the hydrogen permeable alloy is an Nb—Ti—Co alloy having both hydrogen permeability and hydrogen embrittlement resistance and comprising a fourth element including Fe, Cu or Mn.

According to a second aspect of the invention, the content of Fe or Cu is from 1 to 14 mol %.

According to a third aspect of the invention, the content of Mn is from 1 to 9 mol %.

According to a fourth aspect of the invention, the Nb—Ti—Co alloy is represented by the following general formula:

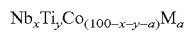

wherein x is smaller than 70; y is from greater than 10 to smaller than 60; and M represents one of Fe, Cu or Mn, with the proviso that when M is Fe or Cu, a is from not smaller than 1 to not greater than 14, and when M is Mn, a is from not smaller than 1 to not greater than 14, and when M is Mn, a is from not smaller than 1 to not greater than 9.

In other words, according to the invention, the properties characteristic to the Nb—Ti—Co alloy cause the (Nb, Ti) phase and the CoTi phase to attain hydrogen permeability and hydrogen embrittlement resistance, respectively, whereby both excellent hydrogen permeability and hydrogen embrittlement resistance can be provided. These properties cannot be impaired and thus remain the same even when Co elements to be incorporated in the alloy are partly replaced by Fe, Cu or Mn. By incorporating Fe, Cu or Mn in the alloy in proper amounts, both excellent hydrogen permeability and hydrogen embrittlement resistance as well as good workability can be obtained. The reason for the limitation of the content of the various components is described below.

(1) Nb: x<70

When x is 70 mol % or more, the resulting alloy undergoes remarkable hydrogen embrittlement and thus cannot be used as a hydrogen permeable alloy. Accordingly, the molar ratio x of Nb is predetermined to be less than 70%.

(2) Ti: 10<y<60

When y deviates from the range of from greater than 10 to smaller than 60, the resulting alloy becomes brittle during casting and thus cannot be used as a hydrogen permeable alloy.

(3) One of Fe, Cu or Mn (a) Fe: 1 to 14 mol %

When Fe is incorporated, it needs to be in the amount of 1 mol % or more because Fe renders the alloy resistant to cracking during the incorporation of hydrogen. On the other hand, when the content of Fe exceeds 14 mol %, the resulting alloy exhibits a deteriorated workability. Accordingly, the content of Fe preferably falls within the above defined range.

(b) Cu: 1 to 14 mol %

When Cu is incorporated, it needs to be in the amount of 1 mol % or more because Cu renders the alloy resistant to cracking during the incorporation of hydrogen. On the other hand, when the content of Cu exceeds 14 mol %, the resulting alloy exhibits a deteriorated hydrogen embrittlement resistance. Accordingly, the content of Cu preferably falls within the above defined range.

(c) Mn: 1 to 9 mol %

When Mn is incorporated, it needs to be in the amount of 1 mol % or more because Mn renders the alloy resistant to cracking during the incorporation of hydrogen. On the other hand, when the content of Mn exceeds 9 mol %, the resulting alloy exhibits a deteriorated workability. Accordingly, the content of Mn preferably falls within the above defined range.

As mentioned above, the hydrogen permeable alloy of the invention is an Nb—Ti—Co alloy having both hydrogen permeability and hydrogen embrittlement resistance wherein Fe, Cu or Mn is incorporated as a fourth element. Accordingly, excellent hydrogen permeability and excellent hydrogen embrittlement resistance characteristic to the Nb—Ti—Co alloy can be provided. At the same time, Co elements, which are expensive, can be partly replaced by Fe, Cu or Mn to reduce the material costs. Furthermore, the incorporation of these components can exert an effect of enhancing workability.

DETAILED DESCRIPTION OF THE PREFERRED EMBODIMENTS

Figure 1:
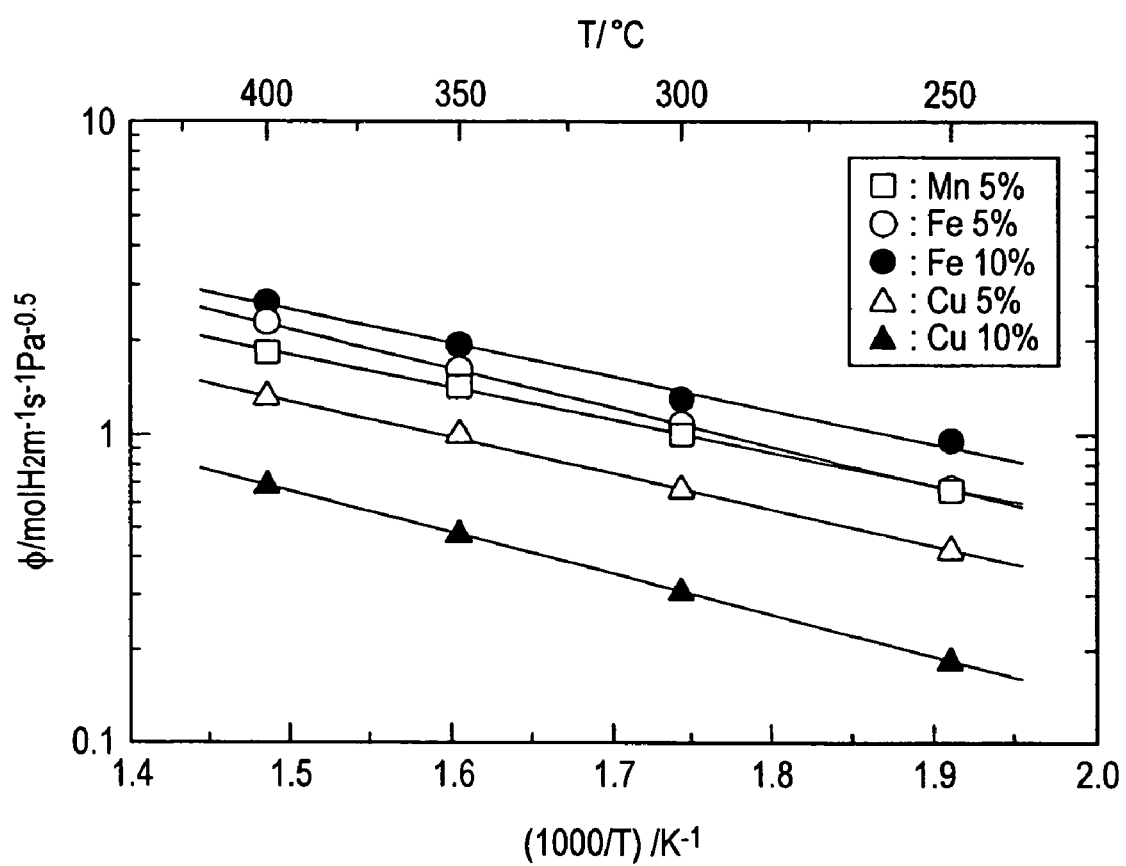
FIG. 1 is a graph illustrating the change of the hydrogen permeability (Φ) in the various test specimens of the example of the invention at different temperatures.

The hydrogen permeable alloy of the invention can be prepared by ordinary methods. More specifically, Nb, Ti, Co and Cu, Fe or Mn are mixed in proper proportions to prepare the alloy. The method of producing the alloy is not specifically limited in the invention. The alloy thus prepared is optionally subjected to heat treatment or working. As previously mentioned, the alloy prepared in this way can be rendered fairly workable. The resulting alloy has an increased degree of workability. The resulting alloy can then be formed into shapes suitable for various uses of the hydrogen permeable material. The hydrogen permeable material exhibits excellent hydrogen permeability as well as excellent resistance to embrittlement caused by the permeation of hydrogen.

EXAMPLE

Alloy ingots of $Nb_{30}Ti_{30}Co_{35-a}M_a$ (in which M is one of Cu, Fe or Mn), wherein the suffix a is varied as set forth in Table 1, were prepared by arc melting. More specifically, the alloys of Example 1 and Comparative Examples 1 to 3 incorporated Mn in the amounts of 5 mol %, 10 mol %, 15 mol % and 20 mol %, respectively. The alloys of Examples 2 and 3 and Comparative Examples 4 and 5 incorporated Fe in the amounts of 5 mol %, 10 mol %, 15 mol % and 20 mol %, respectively. The alloys of Examples 4 and 5 and Comparative Examples 6 and 7 incorporated Cu in the amounts of 5 mol %, 10 mol %, 15 mol % and 20 mol %, respectively.

Each of the prepared alloy ingots were then worked into a disc having a diameter of 12 mm and a thickness of about 1 mm using a wire electric discharge machine. The formed discs were each mirror-polished, and then sputtered with Pd to form a Pd deposit thereon to a thickness of about 200 nm so that their surface was rendered oxidation-inhibitive and catalytic for hydrogen dissociation and recombination. In this way, test specimens were prepared.

Each of these test specimens were set in a hydrogen permeation testing apparatus in which the air within was then evacuated. The test specimens were then heated to 400° C. When the temperature in the testing apparatus reached 400° C., hydrogen was then supplied into the testing apparatus. Under these conditions, the hydrogen permeation rate was then measured while the pressure at the secondary side and at the primary side was kept at 0.1 MPa and 0.2 MPa, respectively. The hydrogen permeation rate was measured in each case as the primary side pressure was raised stepwise up to 0.65 MPa. The measurement of hydrogen permeation rate at 400° C. was followed by the measurement of hydrogen permeation rate at 350° C., 300° C. and 250° C. in the same manner as mentioned above.

The relationship between the hydrogen permeability ($\Phi$) set forth in Table 1 and the hydrogen permeation rate is represented by the following equation (1):

$$\Phi = J \times L/A/(P_1^{0.5} - P_2^{0.5}) \quad (1)$$

wherein J represents the hydrogen permeation rate; L represents the thickness of the specimen; A represents the permeation areas; $P_1$ represents the hydrogen pressure at the primary side; and $P_2$ represents the hydrogen pressure at the secondary side.

Accordingly, when the data obtained at varying primary side pressures are plotted with $A \times (P_1^{0.5} - P_2^{0.5})$ as the abscissa and $J \times L$ as the ordinates, a linear relationship with respect to the various temperatures can be established. The slope of the straight line is defined to be $\Phi$. This relationship was then utilized to determine the hydrogen permeability ($\Phi$) at the various temperatures. The various test specimens were then compared with respect to the hydrogen permeability.

Table 1 shows these results together with the evaluation of ductility during working. FIG. 1 graphically depicts the change of hydrogen permeability with temperature. The alloys of Examples 1 to 5 underwent no cracking even when hydrogen was introduced into their test specimen and exhibited good hydrogen embrittlement resistance as well as good hydrogen permeability. These alloys exhibited better hydrogen permeability when Fe was incorporated therein.

On the other hand, the alloys of Comparative Examples 1 to 5 exhibited a low ductility and thus underwent cracking by the time they were worked into a test specimen. Furthermore, the alloys of Comparative Examples 6 and 7 could be worked into a test specimen but underwent cracking when hydrogen was incorporated into the test specimen, demonstrating that they don't have good hydrogen embrittlement resistance.

TABLE 1

Ductility and hydrogen permeability of various alloys

| | | | $\phi$ ($10^{-8}$ molH$_2$m$^{-1}$s$^{-1}$Pa$^{-0.5}$) | | | | |
|---|---|---|---|---|---|---|---|
| M | a (mol %) | Ductility of alloy | 400° C. | 350° C. | 300° C. | 250° C. | Remarks |
| Mn | 5 | G | 1.83 | 1.41 | 0.98 | 0.64 | Example 1 |
| | 10 | P | — | — | — | — | Comparative Example 1 |
| | 15 | P | — | — | — | — | Comparative Example 2 |
| | 20 | P | — | — | — | — | Comparative Example 3 |
| Fe | 5 | G | 2.28 | 1.58 | 1.04 | 0.65 | Example 2 |
| | 10 | G | 2.68 | 1.91 | 1.27 | 0.92 | Example 3 |
| | 15 | P | — | — | — | — | Comparative Example 4 |
| | 20 | P | — | — | — | — | Comparative Example 5 |

TABLE 1-continued

Ductility and hydrogen permeability of various alloys

| | | | $\phi$ ($10^{-8}$ molH$_2$m$^{-1}$s$^{-1}$Pa$^{-0.5}$) | | | | |
|---|---|---|---|---|---|---|---|
| M | a (mol %) | Ductility of alloy | 400° C. | 350° C. | 300° C. | 250° C. | Remarks |
| Cu | 5 | G | 1.30 | 0.98 | 0.65 | 0.41 | Example 4 |
| | 10 | G | 0.68 | 0.47 | 0.30 | 0.18 | Example 5 |
| | 15 | G | — | — | — | — | Comparative Example 6 |
| | 20 | G | — | — | — | — | Comparative Example 7 |

Ductility:
G: No cracking during working
P: Cracking during working

As can be seen in the aforementioned results, the content of Mn, if any, is preferably not greater than 10 mol % and is preferably from 1 to 9 mol %, taking into account the ductility of the alloy. For the same reason, the content of Fe, if any, is preferably not greater than 15 mol % and is preferably from 1 to 14 mol %. On the other hand, the content of Cu, if any, is preferably not greater than 15 mol % because Cu deteriorates hydrogen embrittlement resistance and is preferably from 1 to 15 mol %.

What is claimed is:

1. A hydrogen permeable Nb—Ti—Co alloy having both hydrogen permeability and hydrogen embrittlement resistance, comprising a fourth element including Fe, Cu or Mn,
wherein the Nb—Ti—Co alloy is represented by $Nb_xTi_yCo_{(100-x-y-a)}M_a$,
wherein x is smaller than 70 mol %, y is from greater than 10 to smaller than 60 mol %, and M comprises Fe, Cu or Mn,
wherein when M comprises Fe or Cu, a is from not smaller than 1 to not greater than 14 mol %,
wherein, when M comprises Mn, a is from not smaller than 1 to not greater than 9 mol %,
wherein the Nb—Ti—Co alloy is a multi-phase alloy, and
wherein the Nb—Ti—Co multi-phase alloy comprises a CoTi phase and an (Nb, Ti) phase.

2. The hydrogen permeable alloy according to claim 1, wherein the fourth element comprises Fe, and
wherein the content of Fe is from 1 to 14 mol %.

3. The hydrogen permeable alloy according to claim 1, wherein the fourth element comprises Cu, and
wherein the content of Cu is from 1 to 14 mol %.

4. The hydrogen permeable alloy according to claim 1, wherein the fourth element comprises Mn, and
wherein the content of Mn is from 1 to 9 mol %.

* * * * *